US012345063B2

(12) United States Patent
Sabo

(10) Patent No.: US 12,345,063 B2

(45) Date of Patent: Jul. 1, 2025

(54) URN PEDESTAL

(71) Applicant: Stephen J. Sabo, Hamilton, NJ (US)

(72) Inventor: Stephen J. Sabo, Hamilton, NJ (US)

(73) Assignee: SG Burial Platform LLC, Hamilton, NJ (US)

( * ) Notice: Subject to any disclaimer, the term of this patent is extended or adjusted under 35 U.S.C. 154(b) by 0 days.

(21) Appl. No.: 17/839,165

(22) Filed: Jun. 13, 2022

(65) Prior Publication Data

US 2022/0396966 A1 Dec. 15, 2022

Related U.S. Application Data

(60) Provisional application No. 63/209,739, filed on Jun. 11, 2021.

(51) Int. Cl.

| | |
|---|---|
| ***E04H 13/00*** | (2006.01) |
| ***A47B 81/00*** | (2006.01) |
| ***A47F 7/28*** | (2006.01) |
| *A61G 17/08* | (2006.01) |

(52) U.S. Cl.

CPC .......... *E04H 13/008* (2013.01); *A47B 81/00* (2013.01); *A47F 7/28* (2013.01); *A61G 17/08* (2013.01)

(58) Field of Classification Search

CPC ......... E04H 13/008; A47B 81/00; A47F 7/00; A47F 7/28; A61G 17/08

See application file for complete search history.

(56) References Cited

U.S. PATENT DOCUMENTS

| | | | | |
|---|---|---|---|---|
| 2,525,091 A * | 10/1950 | Brownawell | E04H 13/00 | 52/103 |
| 3,726,052 A * | 4/1973 | Thompson | E04H 13/003 | 52/27 |
| 3,898,718 A * | 8/1975 | Eubank | E04H 13/00 | 27/29 |
| 5,903,961 A * | 5/1999 | Parker | A61G 17/007 | 27/1 |
| 6,076,292 A * | 6/2000 | Kawa | A61G 17/007 | 52/142 |
| 6,175,995 B1 * | 1/2001 | Parker | A61G 17/08 | 27/1 |
| 6,295,705 B1 * | 10/2001 | Gersten | A61G 17/08 | 220/4.27 |
| 6,389,664 B1 * | 5/2002 | Wood | A61G 17/08 | 40/124.5 |
| 6,463,703 B1 * | 10/2002 | Mattis | E04H 13/003 | 52/103 |
| 6,493,911 B1 * | 12/2002 | Troin | E04H 13/008 | 125/20 |

(Continued)

FOREIGN PATENT DOCUMENTS

| | | | |
|---|---|---|---|
| AT | 16279 U1 * | 5/2019 | E04H 13/006 |
| CA | 2976666 A1 * | 2/2019 | A47G 33/00 |

(Continued)

*Primary Examiner* — Stanton L Krycinski

(57) ABSTRACT

The present disclosure is directed to a new urn display device (urn pedestal) for displaying an urn during a funeral ceremony. The urn display device includes a base that covers and encloses the burial opening where the urn is placed after the ceremony, provides a safe "floor" for anyone approaching the urn, and a central hole in the base that allows the urn to be passed through the base into a burial opening after the ceremony.

4 Claims, 7 Drawing Sheets

(56) References Cited

U.S. PATENT DOCUMENTS

| | | | | |
|---|---|---|---|---|
| 6,520,606 | B1 * | 2/2003 | Robinson | E04H 13/008 27/1 |
| 6,854,165 | B1 * | 2/2005 | Parker | E04H 13/008 27/1 |
| 6,904,721 | B1 * | 6/2005 | Forbes | E04H 13/008 52/103 |
| 6,944,921 | B1 * | 9/2005 | Gersten | E04H 13/008 27/1 |
| 6,988,299 | B1 * | 1/2006 | Barrette | A61G 17/08 27/1 |
| 7,036,195 | B2 * | 5/2006 | Glass | A61G 17/08 27/35 |
| 7,272,874 | B2 * | 9/2007 | Staab | A61G 17/0136 27/1 |
| 7,421,765 | B1 * | 9/2008 | Kaiser | E04H 13/008 27/35 |
| 7,478,461 | B2 * | 1/2009 | Glass | A61G 17/007 27/35 |
| 7,703,185 | B2 * | 4/2010 | Trail | E04H 13/003 52/103 |
| 7,866,013 | B2 * | 1/2011 | Laurens | A61G 17/08 27/1 |
| 8,046,881 | B2 * | 11/2011 | Johnson | A61G 17/0106 40/124.5 |
| 8,074,329 | B2 * | 12/2011 | Roberts | A61G 17/08 27/1 |
| 8,209,918 | B1 * | 7/2012 | Voit | E04H 13/003 52/133 |
| 8,898,873 | B2 * | 12/2014 | Bailey | A61G 17/007 27/1 |
| 8,943,762 | B2 * | 2/2015 | Carlson | E04H 13/008 27/DIG. 1 |
| 8,966,725 | B2 * | 3/2015 | Langelier | A61G 99/00 27/35 |
| 9,051,752 | B1 * | 6/2015 | Muthusami | E04H 13/006 |
| 9,155,673 | B2 * | 10/2015 | Bailey | E04H 13/008 |
| 9,200,470 | B2 * | 12/2015 | Morris | E04H 13/008 |
| 9,233,045 | B2 * | 1/2016 | Lynch | A61G 17/08 |
| 9,290,960 | B1 * | 3/2016 | McHale | E04H 13/00 |
| 9,441,393 | B1 * | 9/2016 | Muthusami | E04H 13/001 |
| 10,123,926 | B2 * | 11/2018 | Brewer | A61G 17/0073 |
| 10,486,855 | B1 * | 11/2019 | Pollman | B65D 21/0228 |
| 10,563,421 | B2 * | 2/2020 | Lockhart | E04H 13/008 |
| 11,135,696 | B1 * | 10/2021 | Yenawine | B24B 7/241 |
| 11,464,699 | B1 * | 10/2022 | Muthusami | B65D 53/02 |
| 2014/0215933 | A1 * | 8/2014 | Carlson | E04H 13/008 52/103 |
| 2015/0128391 | A1 * | 5/2015 | Lynch | F21V 35/00 27/1 |
| 2016/0376810 | A1 * | 12/2016 | Eickhof | E04H 13/003 52/133 |
| 2017/0328082 | A1 * | 11/2017 | Bailey | A61G 17/0136 |
| 2018/0023313 | A1 * | 1/2018 | Power | E04H 13/008 52/128 |
| 2018/0223558 | A1 * | 8/2018 | Birkmeier | E04H 13/008 |
| 2022/0316229 | A1 * | 10/2022 | Griggs | E04H 13/003 |

FOREIGN PATENT DOCUMENTS

| | | | | | |
|---|---|---|---|---|---|
| DE | 19827820 | A1 | * | 12/1999 | E04H 13/00 |
| DE | 10001506 | A1 | * | 7/2001 | E04H 13/008 |
| DE | 102004053414 | A1 | * | 5/2006 | E04H 13/008 |
| DE | 202016101639 | U1 | * | 6/2016 | |
| DE | 202018003155 | U1 | * | 10/2018 | |
| DE | 202018106272 | U1 | * | 12/2018 | E04H 13/006 |
| DE | 202019100996 | U1 | * | 4/2019 | |
| DE | 202019002990 | U1 | * | 10/2019 | |
| EP | 3730726 | A1 | * | 10/2020 | |
| FR | 2961239 | A1 | * | 12/2011 | E02D 5/803 |
| FR | 3044695 | A1 | * | 6/2017 | |
| GB | 2336354 | A | * | 10/1999 | A61G 17/08 |
| KR | 20090041578 | A | * | 4/2009 | |
| KR | 20100032526 | A | * | 3/2010 | |
| KR | 101156307 | B1 | * | 6/2012 | |
| KR | 200471264 | Y1 | * | 2/2014 | |
| KR | 20150006220 | A | * | 1/2015 | |
| WO | WO-2014031168 | A1 | * | 2/2014 | E04H 13/006 |
| WO | WO-2019113670 | A1 | * | 6/2019 | |

* cited by examiner

URN PEDESTAL

CROSS-REFERENCE TO RELATED APPLICATIONS

The present application claims the benefit of U.S. Provisional Patent Application Ser. No. 63/209,739, filed Jun. 11, 2021, entitled "URN PLATFORM." The entire contents of U.S. Provisional Patent Application Ser. No. 63/209,739 are expressly incorporated herein by reference.

BACKGROUND

The present disclosure generally relates to a device for displaying an urn (an urn pedestal) at a cemetery. These urn display devices or urn pedestals are used to display the remains of person, or animal, in preparation for burial. Usually, these devices are presented at a funeral ceremony, before burial, at eye level to individuals who are attending the event and are seated. Furthermore, it is customary at a funeral with a casket to lower the remains of a loved one into the open grave during or after the ceremony. The present device allows for a smooth transition between a mode to present an urn during a ceremony, and then lower the urn into an open grave.

BRIEF SUMMARY

The present disclosure is directed to a new urn display device for displaying an urn during a funeral ceremony. The urn display device includes a base that: (1) covers and encloses the burial opening where the urn is placed after the ceremony; and (2) provides a safe "floor" for anyone approaching the urn. The urn display device is anchored to the ground during the ceremony to ensure that it does not move. The urn display device also includes a shaft and a display surface. After the ceremony, the shaft and display surface are detached from the base section to provide access to the burial opening. In one embodiment of the invention, the urn display device is configured so that the urn is at eye level to those attending the ceremony (who may be sitting down). The urn display device may be entirely enclosed on all four sides, or may have an open side (preferably on the "back" side so that it is not viewable by those attending the ceremony). The urn display device may also include attachments (e.g., magnetic symbols) that designate the religious affiliation for the person being cremated.

BRIEF DESCRIPTION OF SEVERAL VIEWS OF THE DRAWINGS

Applicant's invention is shown in more detail in the accompanying figures. The following is a description of the examples depicted in the accompanying figures. The figures are not necessarily to scale, and certain features and certain views of the figures may be shown exaggerated in scale or in schematic in the interest of clarity or conciseness.

The preceding summary, as well as the following detailed description of certain embodiments of the present invention, will be better understood when read in conjunction with the appended figures. For the purposes of illustration, certain embodiments are shown in the figures. It should be understood, however, that the claims are not limited to the arrangements and instrumentality shown in the attached figures. Furthermore, the appearance shown in the figures is one of many ornamental appearances that can be employed to achieve the stated functions of the system.

Figure 1:
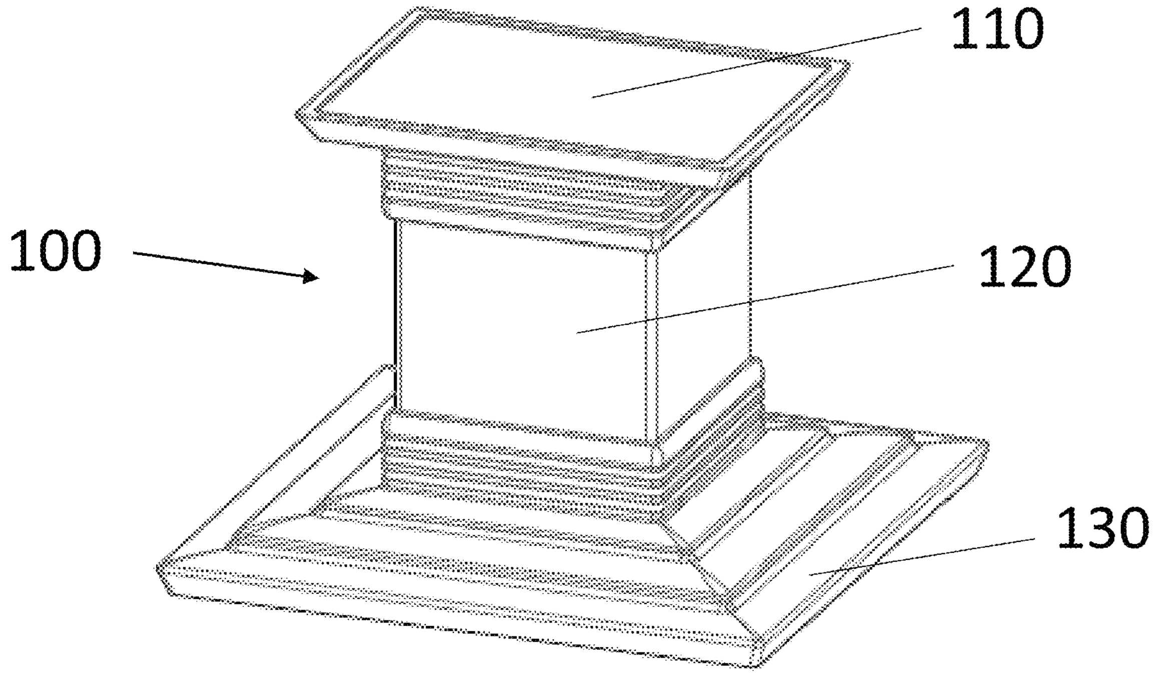
FIG. 1 is an isometric view of an example embodiment of an urn display device.
Figure 2:
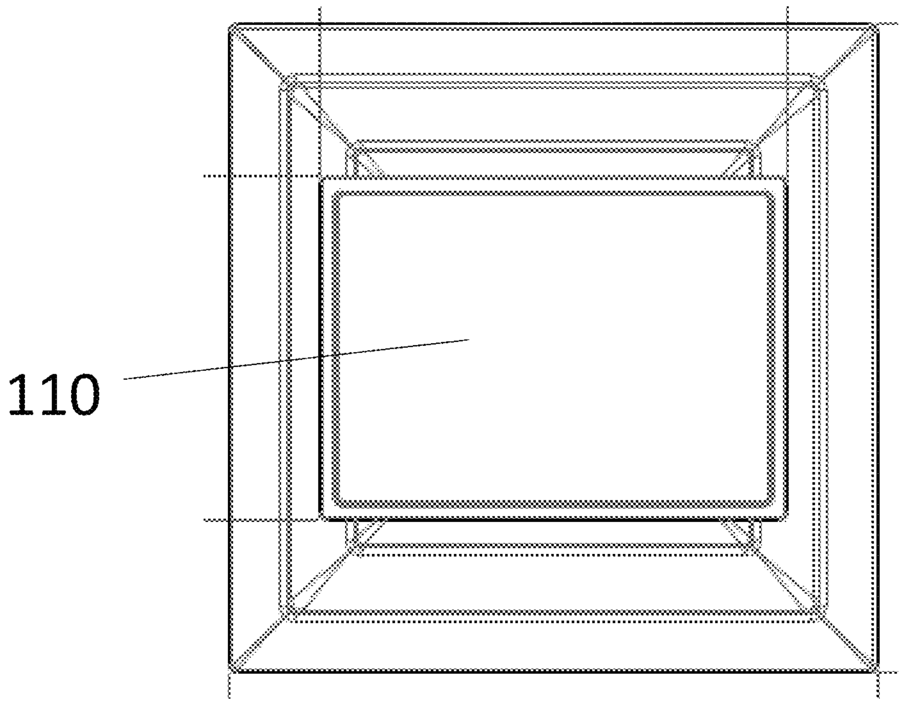
FIG. 2 is a top plan view of the urn display device of FIG. 1.
Figure 3:
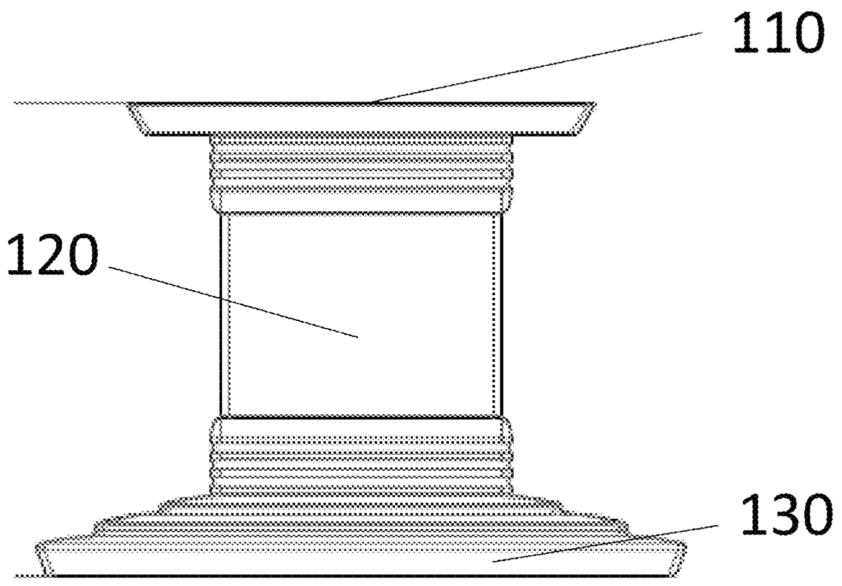
FIG. 3 is a front view of the urn display device of FIG. 1.
Figure 4:
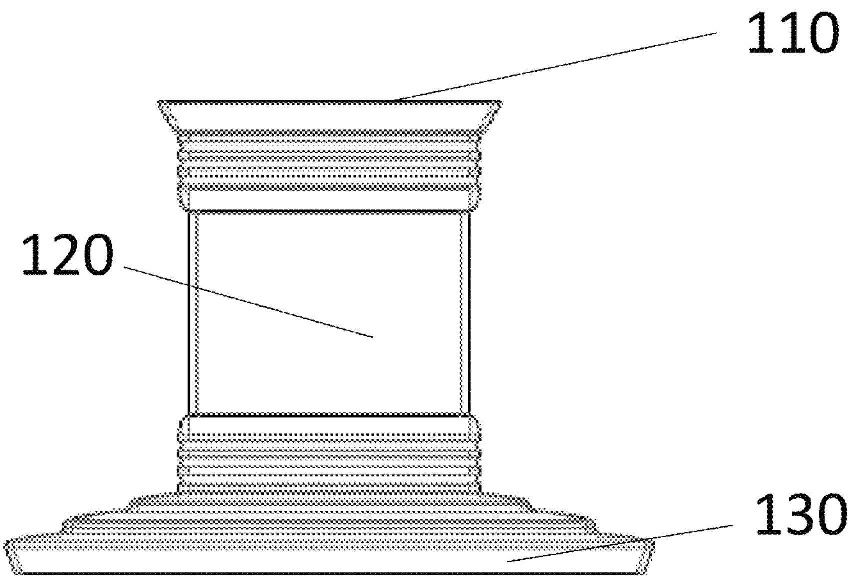
FIG. 4 is a side view of the urn display device of FIG. 1.
Figure 5:
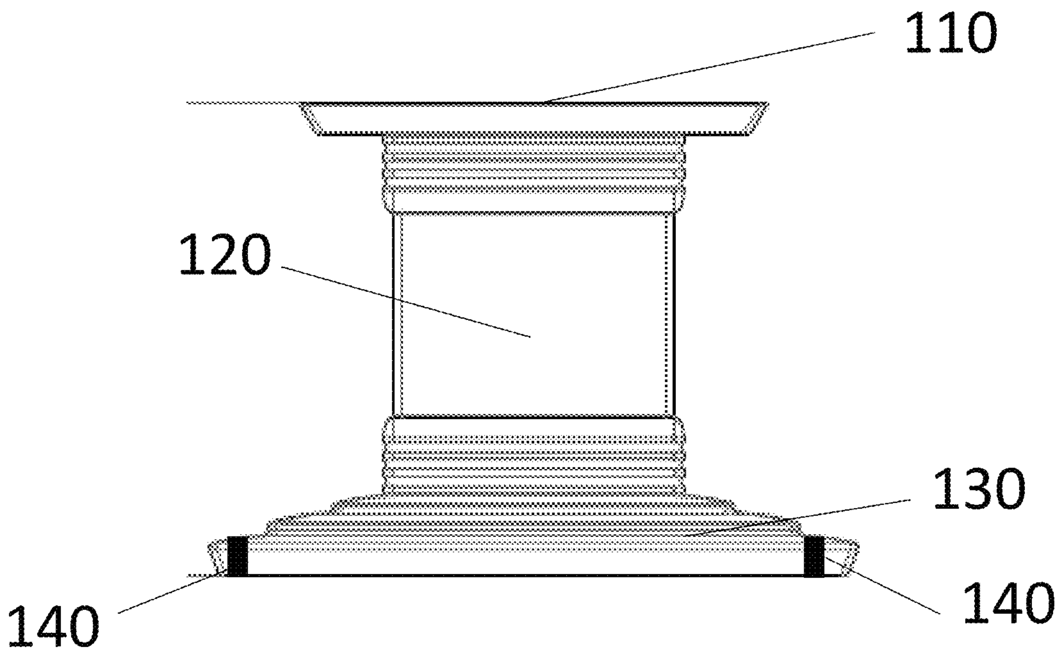
FIG. 5 is a front view of the urn display device of FIG. 1, including anchoring holes.
Figure 6:
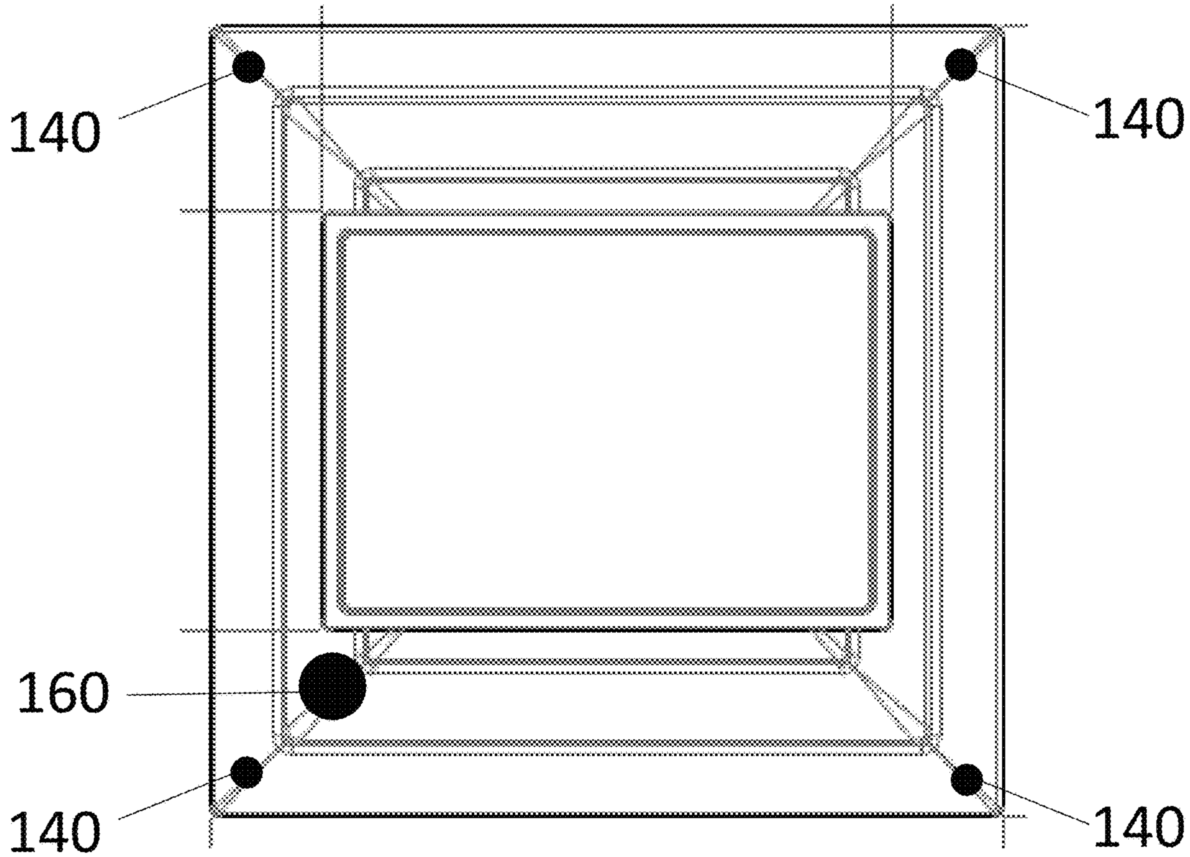
FIG. 6 is a top plan view of the urn display device of FIG. 1, including anchoring holes and a sand hole.

Legend:

| | |
|---|---|
| Urn display device | 100 |
| Display surface | 110 |
| Shaft | 120 |
| Base | 130 |
| Anchoring hole | 140 |
| Anchoring rod | 150 |
| Sand hole | 160 |

DETAILED DESCRIPTION

In the following detailed description, specific details may be set forth in order to provide a thorough understanding of embodiments of the present invention. However, it will be clear to one skilled in the art when embodiments of the present invention may be practiced without some or all of these specific details. In other instances, well-known features or processes may not be described in detail so as not to unnecessarily obscure the invention. In addition, like or identical reference numerals may be used to identify common or similar elements.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

Figure 7:
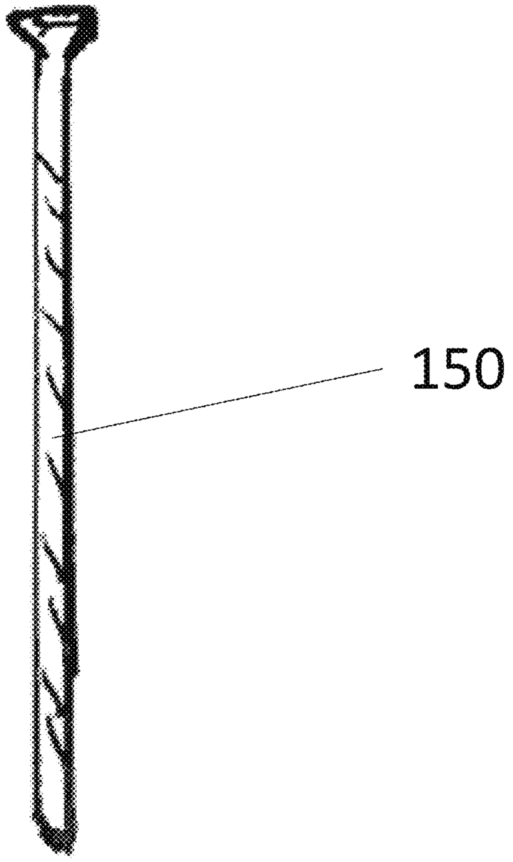
FIG. 7 is an example embodiment of an anchoring rod.

An example urn display device 100 according to the present disclosure is shown in FIGS. 1 to 6. In one embodiment, the urn display device may have a total height of 30.5 inches. The urn display device 100 includes a base 130 from which a column 120 extends to a display surface 100. In one embodiment, the base may have a length of 42 inches and a width of 42 inches. In one embodiment, the display surface 100 may have a length of 30 inches and a width of 22 inches. An urn (not shown) may be placed on the display surface 100. The urn display device 100 may comprise one or more anchoring holes 140 through which an anchoring rod 150, shown in FIG. 7, may be inserted in order to affix the urn display device to ground or a surface beneath the base 130. In one embodiment, the one or more anchoring holes 140 may have a ½ inch diameter. In this embodiment, the anchoring rods may also have a ½ inch diameter. The anchoring rods 150 may be 6 inches long. In one embodiment, the one or more anchoring holes 140 may be located 1 inch from an outer edge of the base 130. In certain embodiments, the anchoring rod 150 may alternatively be an anchoring screw or other component that is able to affix the urn display device to ground or a surface beneath the base 130. In certain embodiments, the urn display device 100 may comprise a sand hole 160, into which sand may be poured to add weight to the urn display device, if necessary. The urn display device 100 may also comprise a sand hole cap to close the sand hole 160. The urn display device 100 may also include a side or a portion of a side that is magnetic. Attachments (e.g., magnetic symbols) that designate the religious affiliation for the person being cremated can then be removably attached to the magnetic side of the urn display device 100.

According to an embodiment of the present disclosure, the shaft 120 and display surface 110 may be detached from the base 130. The base 130 may include a central hole through which an urn could be passed into a burial space.

Some of the elements described herein are identified explicitly as being optional, while other elements are not identified in this way. Even if not identified as such, it will be noted that, in some embodiments, some of these other elements are not intended to be interpreted as being necessary, and would be understood by one skilled in the art as being optional.

While the present disclosure has been described with reference to certain implementations, it will be understood by those skilled in the art that various changes may be made and equivalents may be substituted without departing from the scope of the present method or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present disclosure is not limited to the particular implementations disclosed. Instead, the present disclosure will include all implementations falling within the scope of the appended claims, both literally and under the doctrine of equivalents.

What is claimed is:

1. A pedestal for displaying an urn at a funeral ceremony comprising:

a base for covering and enclosing a burial opening in the ground, said base further comprising a central hole extending through the base;

a display surface comprising a placement area for displaying the urn during the funeral ceremony;

a shaft extending from the base to the display surface, said shaft being detachable from the base to expose the central hole;

wherein the central hole is large enough to allow an urn to be passed through the central hole into the burial opening; and wherein the base is wider than the display surface.

2. A pedestal for displaying an urn at a funeral ceremony comprising:

a base for covering and enclosing a burial opening in the ground, said base further comprising a central hole extending through the base;

a display surface comprising a placement area for displaying the urn during the funeral ceremony;

a shaft extending from the base to the display surface, said shaft being detachable from the base to expose the central hole;

wherein the central hole is large enough to allow an urn to be passed through the central hole into the burial opening; and wherein the base is longer than the display surface.

3. A pedestal for displaying an urn at a funeral ceremony comprising:

a base for covering and enclosing a burial opening in the ground, said base further comprising a central hole extending through the base;

a display surface comprising a placement area for displaying the urn during the funeral ceremony;

a shaft extending from the base to the display surface, said shaft being detachable from the base to expose the central hole;

wherein the central hole is large enough to allow an urn to be passed through the central hole into the burial opening; and wherein the base encloses the shaft on three sides.

4. A pedestal for displaying an urn at a funeral ceremony comprising:

a base for covering and enclosing a burial opening in the ground, said base further comprising a central hole extending through the base;

a display surface comprising a placement area for displaying the urn during the funeral ceremony;

a shaft extending from the base to the display surface, said shaft being detachable from the base to expose the central hole;

wherein the central hole is large enough to allow an urn to be passed through the central hole into the burial opening; and wherein the base encloses the shaft on four sides.

* * * * *